United States Patent
Grechanik et al.

(10) Patent No.: US 8,516,442 B2
(45) Date of Patent: Aug. 20, 2013

(54) GRAPHICAL USER INTERFACE METADATA EVOLUTION TOOL

(75) Inventors: Mark Grechanik, Chicago, IL (US); Qing Xie, Chicago, IL (US); Chen Fu, Downers Grove, IL (US)

(73) Assignee: Accenture Global Services Limited, Dublin (IE)

( * ) Notice: Subject to any disclaimer, the term of this patent is extended or adjusted under 35 U.S.C. 154(b) by 1542 days.

(21) Appl. No.: 12/038,672

(22) Filed: Feb. 27, 2008

(65) Prior Publication Data

US 2009/0217250 A1 Aug. 27, 2009

(51) Int. Cl.
*G06F 9/44* (2006.01)

(52) U.S. Cl.
USPC ........... 717/122; 717/101; 717/143; 717/120; 715/700; 715/229

(58) Field of Classification Search
USPC ................... 717/101–178; 711/163; 714/26; 715/234, 229, 700–978
See application file for complete search history.

(56) References Cited

U.S. PATENT DOCUMENTS

| | | | |
|---|---|---|---|
| 5,781,720 A | 7/1998 | Parker et al. | |
| 6,216,212 B1* | 4/2001 | Challenger et al. | 711/163 |
| 6,549,922 B1* | 4/2003 | Srivastava et al. | 1/1 |
| 6,898,764 B2* | 5/2005 | Kemp | 715/762 |
| 6,990,654 B2* | 1/2006 | Carroll, Jr. | 717/109 |
| 7,246,134 B1* | 7/2007 | Kitain et al. | 1/1 |
| 7,546,602 B2 | 6/2009 | Hejlsberg et al. | |
| 7,562,307 B2* | 7/2009 | Betts et al. | 715/762 |
| 7,716,662 B2 | 5/2010 | Seiden | |
| 7,873,908 B1* | 1/2011 | Varanasi et al. | 715/763 |
| 7,937,338 B2* | 5/2011 | Boguraev et al. | 706/12 |
| 2003/0052917 A1* | 3/2003 | Dubovsky | 345/764 |
| 2003/0202012 A1 | 10/2003 | Kemp | |
| 2003/0236775 A1* | 12/2003 | Patterson | 707/3 |
| 2004/0002818 A1 | 1/2004 | Kulp et al. | |
| 2004/0002989 A1* | 1/2004 | Kaminer | 707/102 |
| 2005/0166094 A1* | 7/2005 | Blackwell et al. | 714/38 |
| 2005/0204343 A1* | 9/2005 | Kisamore et al. | 717/124 |
| 2005/0235274 A1* | 10/2005 | Mamou et al. | 717/136 |
| 2006/0015847 A1 | 1/2006 | Carroll, Jr. | |
| 2006/0168577 A1 | 7/2006 | Melo et al. | |
| 2006/0230314 A1* | 10/2006 | Sanjar et al. | 714/26 |
| 2007/0006043 A1 | 1/2007 | Pins | |
| 2007/0074121 A1* | 3/2007 | Mullender et al. | 715/744 |

(Continued)

OTHER PUBLICATIONS

Compuware, The Leader in IT Value, "Accelerate Testing and Deliver High Quality Applications on Time," 2008 Compuware Corporation, 2 pages.

(Continued)

*Primary Examiner* — Lewis A Bullock, Jr.
*Assistant Examiner* — Francisco Aponte
(74) *Attorney, Agent, or Firm* — Brinks Hofer Gilson & Lione

(57) ABSTRACT

A metadata migration tool helps GUI application developers keep track of institutional knowledge that may be lost between application versions. The maintenance and transference of this knowledge from one application version to another aids developers in conforming future applications to restrictions and requirements imposed on previous versions that may not be immediately apparent. The architecture and processes facilitate the migration of this institutional knowledge, thus greatly reducing the time, cost, and resource expenditures spent re-creating similar components in an updated application and updated scripts to test those application components.

16 Claims, 13 Drawing Sheets

(56) References Cited

U.S. PATENT DOCUMENTS

| | | |
|---|---|---|
| 2007/0143327 A1* | 6/2007 | Rivas et al. .................. 707/101 |
| 2007/0143398 A1 | 6/2007 | Graham |
| 2007/0240116 A1 | 10/2007 | Bangel et al. |
| 2007/0271203 A1* | 11/2007 | Delvat .......................... 705/400 |
| 2008/0092068 A1* | 4/2008 | Norring et al. ................ 715/762 |
| 2008/0282230 A1* | 11/2008 | Belvin et al. .................. 717/125 |
| 2009/0217250 A1 | 8/2009 | Grechanik et al. |
| 2009/0217302 A1 | 8/2009 | Grechanik et al. |

OTHER PUBLICATIONS

Grechanik et al., "Reducing Effort in Script-Based Testing," Accenture Technology Labs, Systems Integration Group, Chicago, Illinois, Nov. 11, 2007, pp. 1-22.

Hewlett-Packard Development Company, "HP Functional Testing Software, BTO Software," 2008, 1 page.

Hewlett-Packard Development Company, HP QuickTest Professional Software, data sheet, 2007, 4 pages.

IBM, "Rational Robot, Features and Benefits," "Rational Software," undated, 1 page.

IBM, "Rational Robot, Overview," "Rational Software," undated, 1 page.

Pierce, Benjamin C., "Types and Programming Languages," The MIT Press, Cambridge, Massachusetts, 2008, ISBN 0-262-16209-1, complete book.

Extended European Search Report dated Feb. 10, 2011 for corresponding European Patent Office Application No. 09250551.0.

Memon et al., "Regression Testing of GUIs," Proceedings of ESEC/FSE '03, Sep. 1-5, 2003, pp. 118-127, Helsinki, Finland, XP-002617924.

Memon et al., "Automating Regression Testing for Evolving GUI Software," *Journal of Software Maintenance and Evolution: Research and Practice,* vol. 17, No. 1, Jan. 1, 2005, pp. 27-64, XP002617925.

United States Patent and Trademark Office Action dated Dec. 13, 2010 for corresponding co-pending U.S. Appl. No. 12/038,658.

United States Patent and Trademark Office Action dated Sep. 29, 2011 for co-pending U.S. Appl. No. 12/038,665.

First Office Action dated Jun. 24, 2011 for co-pending Chinese Patent Application No. 200910118531.X with English translation.

First Examiner's Report dated Jul. 4, 2011 for co-pending Canadian Patent Application No. 2,653,887.

Memon et al., "Regression Testing of GUIs," *Proceedings of ESEC/FSE '03,* Sep. 1, 2003, pp. 118-127 (10 pages).

First Office Action dated Nov. 16, 2011 for co-pending Chinese Patent Application No. 200910118535.8.

\* cited by examiner

GRAPHICAL USER INTERFACE METADATA EVOLUTION TOOL

CROSS REFERENCE TO RELATED APPLICATIONS

This application is related to following applications, all filed on the same day:
U.S. patent application Ser. No. 12/038,665, filed Feb. 27, 2008;
U.S. patent application Ser. No. 12/038,676, filed Feb. 27, 2008;
U.S. patent application Ser. No. 12/038,661, filed Feb. 27, 2008;
U.S. patent application Ser. No. 12/038,658, filed Feb. 27, 2008; and
U.S. patent application Ser. No. 12/038,675, filed Feb. 27, 2008.

BACKGROUND OF THE INVENTION

1. Technical Field

This disclosure relates to the storage of metadata associated with a graphical user interface (GUI) element in a GUI application (GAP), and in particular relates to the migration of the stored metadata from one GUI element in one version of a GAP to a corresponding GUI element in another version of the GAP.

2. Related Art

The relentless pace of advancing technology has given rise to complex computer software applications to help automate almost every aspect of day-to-day existence. Today applications exist to assist with writing novels to filing income tax returns to analyzing historical trends in baby names. One nearly ubiquitous feature of these applications is that they employ graphical user interfaces (GUIs). Another nearly ubiquitous aspect is that the GUI applications (GAPs) require thorough testing prior to release.

Nevertheless, in the past it has been easier to implement the GUI to the application than to thoroughly test the GAP. For GAPs of any significant complexity, the permutations and combinations of GUI elements gives rise to an enormous field of potential commands and command sequences that could have bugs of any severity, from insignificant to critical failure. Exacerbating the problem is that application developers are under pressure to continually add new features, update the GUI, and release new versions of applications. As a result, even if a test script for a prior version of a GAP were adequate, it is rarely the case that the original test script can adequately test the subsequent revised application.

Manually testing large-scale enterprise GAPs is tedious, error prone, and laborious. Nontrivial GAPs contain hundreds of GUI screens that in turn contain thousands of GUI objects. In order to automate testing of GAPs, test engineers write programs using scripting languages (e.g., JavaScript and VBScript), and these testing scripts drive GAPs through different states by mimicking users who interact with these GAPs by performing actions on their GUI objects. Often test scripts simulate users of GAPs, and their statements access and manipulate GUI objects of these GAPs. For example, the statement:

VbWindow("Login").VbEdit("txtAgentsName").Set "Shawn"

locates a window whose caption is "Login" and that is created by a Visual Basic-based control, then it locates a text box whose name is "txtAgentsName" that is a GUI object whose parent is the "Login" window. By calling the method Set with the parameter "Shawn", the value of the text box is set to "Shawn".

Commercial tools such as QTP and Rational Robot help generate test scripts by tracking a user's pointing of a cursor at GUI objects and performing desired actions. These tools generate scripting code that can replay captured user actions. The generated code serves as a skeleton for creating scripts to automate script testing. Test engineers add code to the generated scripts so that these scripts can replay using different input values thereby exercising the complete functionality of the GAP.

Expanding automatically generated test scripts with manually written code to automate tests makes the test script more complex, difficult to understand, maintain, and evolve. Although it is known in advance that the test scripts access and manipulate GUI elements, it is not clear how to detect operations at compile time that lead to runtime errors. Using API calls exported by testing platforms remains a primary mode of accessing and manipulating GUI objects of GAPs, and these API calls lead to various run-time errors in the test scripts. For example, test personnel may use platform API calls incorrectly in the test script source code thereby accessing GUI elements that they did not intend to access.

It is a difficult technical challenge to check test scripts for potential flaws caused by third party API calls that lead to incorrect tests and runtime errors in the test scripts. Furthermore, there are fundamental problems with using API calls to access and manipulate GUI objects. First, the API calls take names and property values of GUI objects as string input parameter variables. The values of these input parameters are often known only at runtime, making it impossible to apply sound checking algorithms. Second, testing platforms export dozens of different API calls, and high complexity of these API calls makes it difficult for programmers to understand which API calls to use and how to combine them to access and manipulate GUI objects. These problems lead to a wide range of bugs in the test scripts, many of which are difficult to detect during the inspection of the test script source code.

A further problem arises because application requirement specifications include high-level concepts that describe GAPs, specifically its GUI objects. Unfortunately, tracing GUI objects of GAPs to these high-level concepts is a difficult problem because programmers do not document these traces. Accordingly, when test personnel create GAPs, they spend considerable time to understand how to use these GAPs by reading documentation and talking to subject matter experts. This crucial knowledge is often lost after test personnel are reassigned to other tasks or quit the company.

One of the perceived benefits of existing approaches to creating test scripts is that type checking is not required since the script code is generated directly from GUIs. For example, given certain GUI objects in a GAP, a testing tool can produce corresponding statements that navigate to these objects using API calls with string parameters describing their properties. However, this perceived benefit in fact gives rise to difficult technical challenges due to semantic inconsistencies between the test script and the GAP. Suppose, for example, that during the maintenance phase the GUI of the GAP changed. The scripting interpreter is not aware of the change and it would run the generated script without producing any compile-time warnings. However, the resulting script either fails at run time or produces incorrect test results because its code attempts to access GUI objects that are either changed or do not exist anymore.

An additional difficulty arises from the management of the enormous amount of data generated in association with each GAP, the different versions of each GAP, and the GUI objects within each GAP version.

Therefore, a need exists for a test script generation architecture with supporting analysis and evaluation logic that addresses the problems noted above and other previously encountered.

SUMMARY

A graphical user interface (GUI) metadata evolution architecture uses GUI metadata processing logic to address the technical challenges associated with managing potentially large amounts of informational data describing a GUI. The GUI metadata processing logic may include communication logic, parsing logic, and type processing logic. The communication logic may obtain a GUI element type specification message. The parsing logic may parse the message for a GUI element identifier and a GUI type identifier. The type processing logic may maintain a GUI element type metadata record in a GUI element metadata repository. For example, the type processing logic may store the GUI type identifier in a metadata record located by the GUI element identifier. The GUI metadata processing logic also maintains GUI element version mappings that have been specified between GUI elements between GAP versions.

Other systems, methods, features and advantages will be, or will become, apparent to one with skill in the art upon examination of the following figures and detailed description. All such additional systems, methods, features and advantages are included within this description, are within the scope of the claimed subject matter, and are protected by the following claims.

BRIEF DESCRIPTION OF THE DRAWINGS

The system may be better understood with reference to the following drawings and description. The elements in the figures are not necessarily to scale, emphasis instead being placed upon illustrating the principles of the system. In the figures, like-referenced numerals designate corresponding parts throughout the different views.

DETAILED DESCRIPTION OF THE PREFERRED EMBODIMENTS

Figure 1:
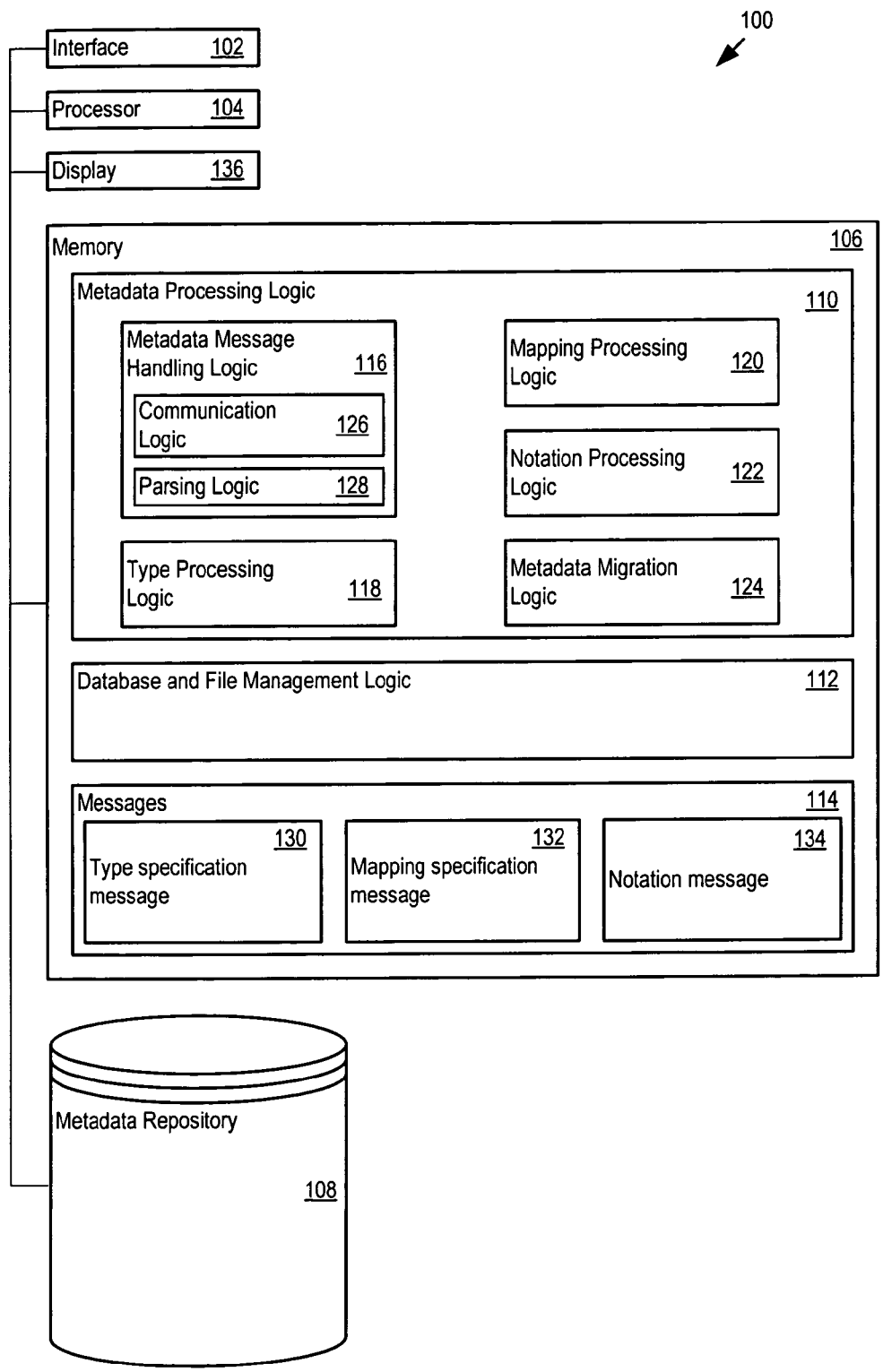
FIG. 1 shows a metadata evolution tool architecture.

FIG. 1 shows one embodiment of a metadata evolution tool architecture 100. The architecture 100 includes an interface 102, a processor 104, a memory 106, and a metadata repository 108. The architecture 100 may communicate with other systems through the interface 102. For example, the architecture 100 may receive requests for metadata information and send responses to those requests through the interface 102. Alternatively or additionally, the architecture 100 may send instructions to the interface 102 to display a prompt at a non-local terminal and may receive responses to the prompt through the interface 102. Alternatively or additionally, the processor 104 may send instructions to display a prompt at display 136 and may receive responses to the prompt. The processor 104 executes the logic stored in the memory 106. The metadata repository 108 receives, retrieves, and stores metadata information processed by the processor 104.

The memory 106 may include metadata processing logic 110, database and file management logic 112, and messages 114. The metadata processing logic 110 may instruct the processor 104 to perform process flows for maintaining and migrating metadata. The database and file management logic 112 may instruct the processor 104 to perform processes relevant to data storage, retrieval, and manipulation to and from the metadata repository 108. The messages 114 may be stored in the memory when received from the interface 102 and manipulated by the processor 104 according to instructions from the metadata processing logic 106.

The metadata processing logic 110 includes metadata message handling logic 116, type processing logic 118, mapping processing logic 120, notation processing logic 122, and metadata migration logic 124. The metadata message handling logic 116 may instruct the processor 104 to store messages 114 received from the interface 102 in the memory 106 and process the messages 114 as described below. The metadata message handling logic 116 may include communication logic 126 and parsing logic 128. The communication logic 126 may instruct the processor 104 to send and receive messages 114 through the interface 102. The communication logic 126 may also instruct the processor 104 to store the messages 114 in the memory 106. Alternatively or additionally, the communication logic 126 may send instructions to the interface 102 to display a prompt to a non-local terminal and may instruct the processor 104 to process instructions received by the interface 102 in response to the prompt. Alternatively or additionally, the communication logic 126 may instruct the processor 104 to send instructions to the display 136 to display a prompt, and the processor 104 may process instructions received in response to the prompt. The parsing logic 128 may instruct the processor 104 to parse the messages 114. For example, the parsing logic 128 may instruct the processor 104 to extract metadata identification information from the messages.

The type processing logic 118, mapping processing logic 120, and notation processing logic 122 may instruct the processor 104 to process metadata messages, such as type specification message 130, mapping specification message 132, and notation message 134. For example, the type processing logic 118, mapping processing logic 120, or notation processing logic 122 may instruct the processor 104 to maintain a metadata record stored in the metadata repository 108. In that regard, the processor 104 may direct reading, writing, storing, copying, updating, moving, deleting, overwriting, appending, or otherwise manipulating data stored within a metadata record in the metadata repository 108. The type processing logic 118, mapping processing logic 120, or notation processing logic 122 may be performed in conjunction with processes from the database and file management logic 112. The messages 114 include as examples type specification messages 130, mapping specification messages 132, and notation messages 134, but may include other messages related to metadata. The type specification messages 130, the mapping specification messages 132, and the notation messages 134 are discussed in more detail with regard to FIGS. 3, 4, and 5, respectively.

Figure 2:
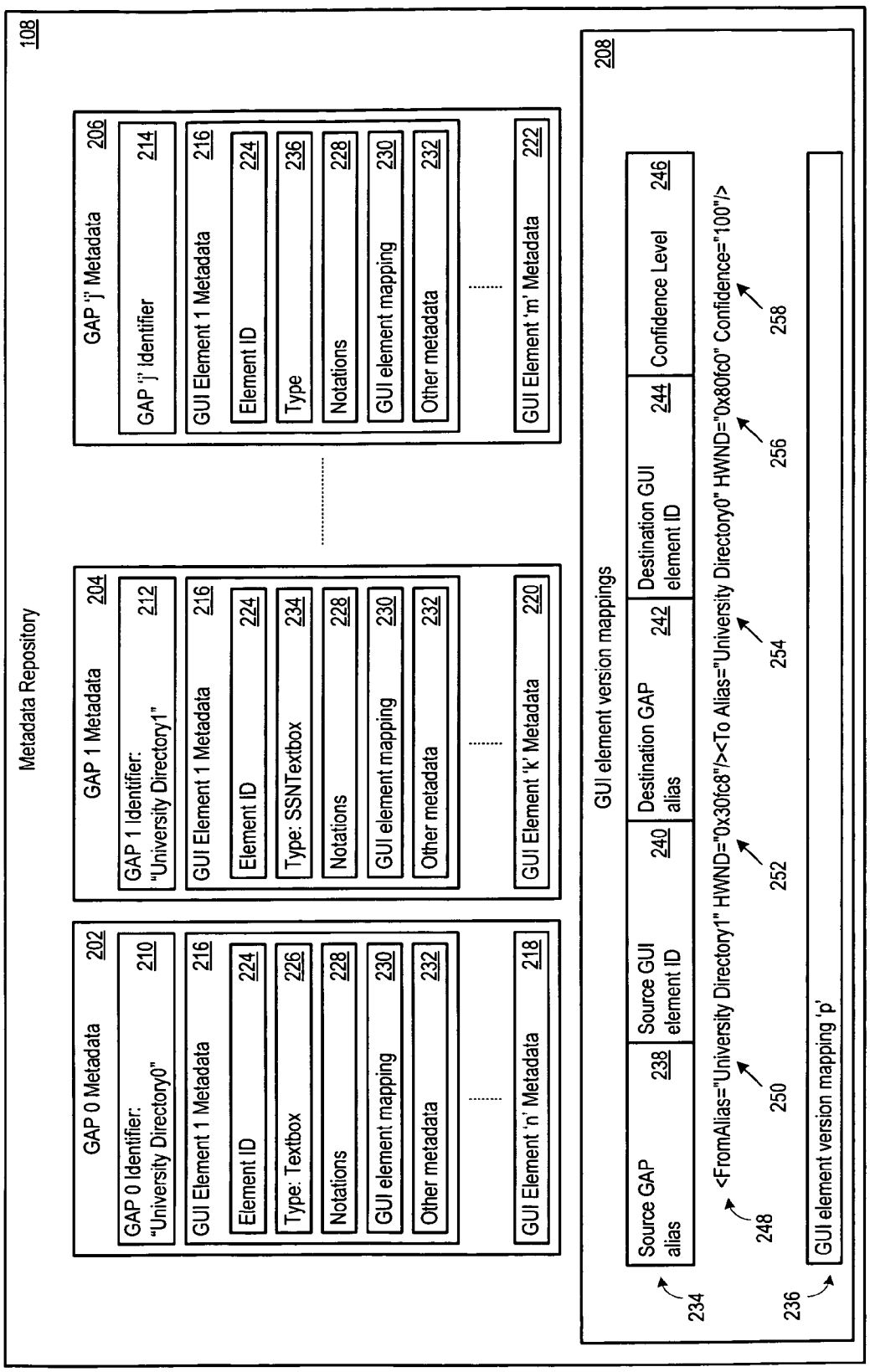
FIG. 2 shows a metadata repository architecture.

FIG. 2 shows one implementation of the metadata repository 108. The metadata repository 108 may be organized in many different ways, however. The metadata repository 108 may include a GAP 0 metadata record 202, GAP 1 metadata record 204 through GAP 'j' metadata record 206, and a GUI element version mapping record 208. The GAP metadata records 202, 204, and 206 may store metadata associated with a specific GAP or GAP version. The GUI element version mapping record 208 may store the mappings from one GUI element to another GUI element.

Each GAP metadata record may include a GAP identifier. The GAP identifiers 210, 212, and 214 may serve to identify either a GAP, a version of a GAP, or both. For example, GAP 0 metadata record 202 contains a GAP 0 identifier 210 of "University Directory0" and GAP 1 metadata record 204 contains a GAP 1 identifier 212 of "University Directory1." In this case, "University Directory0" may serve to identify the whole GAP as "University Directory0." Alternatively or additionally, "University Directory0" may serve to identify the version of the GAP as version 0 (e.g., the current version) of the GAP "University Directory." The metadata repository 108 may store metadata records for multiple GAPs, as well as multiple metadata records for each of the multiple versions of each GAP.

The GAP 0 metadata record 202 additionally may include GUI element 1 metadata record 216 through GUI element 'n' metadata record 218. The total number 'n' of GUI element metadata records stored within each GAP metadata record may vary depending on the complexity of the GAP. Each GUI element metadata record may correspond to a GUI element within a GAP or a version of a GAP, and each GUI element within a GAP may have a corresponding GUI element metadata record within the GAP metadata record. For example, GAP 0 metadata record 202 contains GUI element 'n' metadata record 218 indicating that GAP 0 may be composed of 'n' or more identifiable GUI elements. Alternatively or additionally, GUI element 'n' metadata record 218 may indicate that GAP 0 metadata record 202 currently contains 'n' GUI element metadata records, where 'n' may be an integer value from 0 up to the total number of GUI elements in GAP 0. Every GUI element in a GAP may not have a corresponding GUI element metadata record. Similarly, GAP 1 metadata record 204 may contain GUI element 'k' metadata record 220, and GAP 'j' metadata record may contain GUI element 'm' metadata record 222.

Each of the GUI element metadata records 216, 218, 220, and 222 may include a GUI element identifier 224, a type identifier 226, a notation 228, a GUI element mapping 230, and other metadata 232. A GUI element identifier 224 may serve to identify a GUI element within the GAP or GAP version, using a unique number, character string, or other indicia. For example, one element ID may be "0x30fb0." A type identifier 226 may be a classification of a GUI element that defines high level semantics, annotations and properties, permitted or restricted behaviors, and values associated with the GUI element. For example, one type identifier may be "US-StateTextBox" which may specify a type of text box GUI element that only accepts strings corresponding to the names of the states of the United States. This information may come from the knowledge of a testing engineer when he or she tries to understand the semantics of each GUI element in the GAP under test.

A notation 228 may include text, notes, informal comments, constraints, or information derived from a technical specification that one programmer may wish to convey to another programmer about a particular GUI element. For example, a notation 228 may include the text "State Names Only," as an informal method of conveying to another programmer that only strings corresponding to the names of states of the United States should be included. A GUI element mapping 230 may identify a GUI element in another GAP or GAP version corresponding to the GUI element associated with the GUI element metadata record. For example, a GUI element mapping 230 may include the values "University Directory1" and "0x30fc8" to indicate that the GUI element associated with this GUI element metadata record corresponds to GUI element 0x30fc8 in the GAP University Directory, version 1. Additionally, other metadata 232 may be stored in association with a GUI element metadata record.

The metadata repository 108 may include any number of GUI element version mapping records, such as the record 208. The number of GUI element version mapping records 208 may vary according to the number of GAPs or GAP versions. For example, each GUI element version mapping record 208 may include mappings from one specific GAP version to another specific GAP version. Alternatively or additionally, each GUI element version mapping record 208 may include all of the mappings between all of the versions of a single GAP. The example of FIG. 2 shows that the GUI element version mapping record 208 includes GUI element version mappings 234 and 236. The number of GUI element version mappings 234 and 236 in a GUI element version mapping record 208 may vary according to the number of mappings made between GUI elements of different GAPs or GAP versions.

Each GUI element version mapping 234 or 236 may include a source GAP alias identifier 238, a source GUI element identifier 240, a destination GAP alias identifier 242, a destination GUI element identifier 244, and a confidence level value 246. The GUI element version mapping 248 provides an example of a GUI element version mapping using extensible markup language (XML). The GUI element version mapping 248 includes a source GAP alias identifier 250, a source GUI element identifier 252, a destination GAP alias identifier 254, a destination GUI element identifier 256, and a confidence level value 258. In this example, the mapping indicates a correspondence between GUI element 0x30fc8 of GAP University Directory, version 1 (e.g. a subsequent version), to GUI element 0x80fc0 of GAP University Directory, version 0 (e.g. a current version), with a confidence level of 100. The confidence level values may use decimal values between 0 and 1, integer values between 0 and 100, or any other scale, to indicate the strength of the certainty to which the mapping between the GUI elements is a correct mapping. For example, a mapping provided by a human user may have a high or absolute confidence of 1 or 100 percent, where a mapping provided by a mapping evaluation program using GUI element property comparison may have a lower or no confidence. Alternatively or additionally, a mapping provided by a mapping evaluation program using GUI element property comparison may have a high or absolute confidence, where a mapping provided by a human user may have a lower or no confidence.

The processor 104 uses the database and file management logic 112 to access and manipulate any of the GAP metadata records 202, 204, or 206, GUI element metadata records 216, 218, 220, or 222, and/or GUI element version mapping records stored in the metadata repository 108. The access and manipulation of the data in the metadata repository 108 may include reading, writing, storing, copying, updating, moving, deleting, overwriting, appending, or any other function performed on data.

Figure 3:
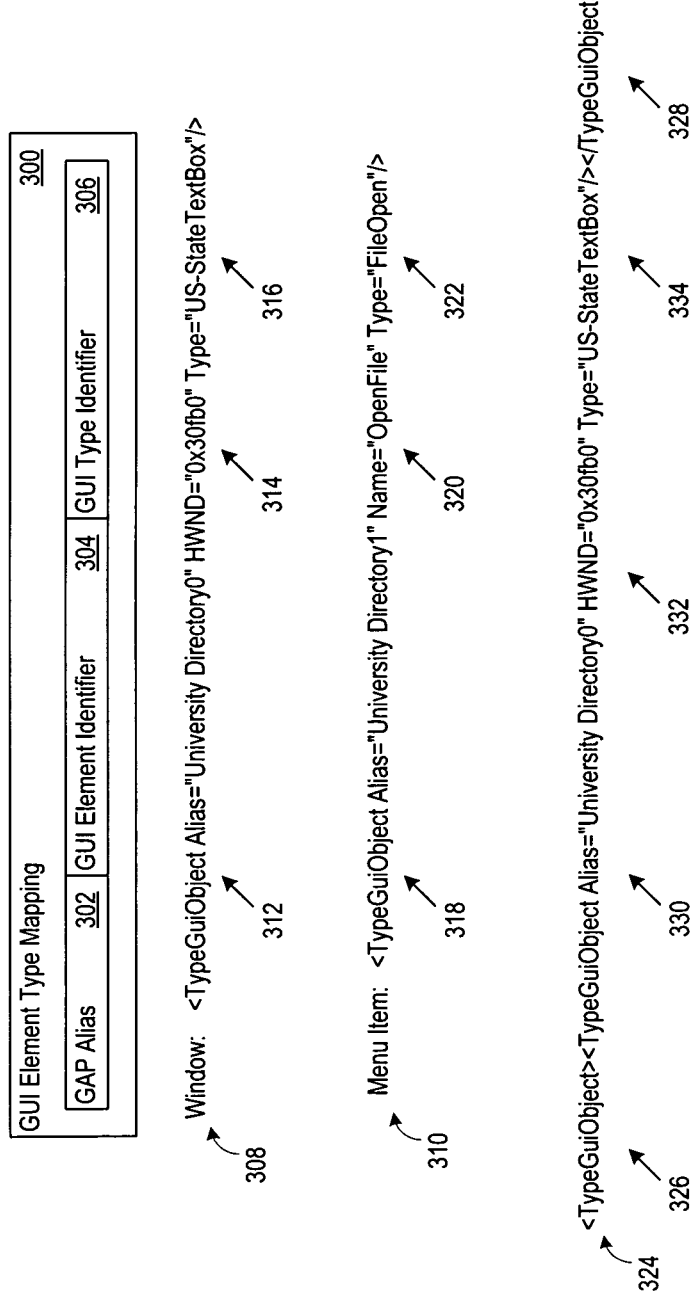
FIG. 3 shows examples of type specification messages.

FIG. 3 shows an example of a GUI element type mapping 300 that may be a component of a GUI element type specification message 130. The GUI element type mapping 300 includes a GAP alias 302, a GUI element identifier 304, and a GUI type identifier 306. Additional, fewer, or different fields may be included in the GUI element type mapping 300.

The GAP alias 302 may specify an identifier for the GAP which includes the GUI element to which a type is being applied. The GAP alias 302 may be a unique identifier that distinguishes between GAPs or GAP versions, including a current GAP version and a subsequent version of the same GAP. The GUI element identifier 304 may provide a unique identifier for the GUI element which is being typed. The GUI type identifier 306 specifies the GUI element type being assigned to the GUI element (e.g., SSNTextBox).

FIG. 3 also shows two examples of GUI element type mappings 308 and 310 using an XML representation. The base XML tag may be a "TypeGUIObject" tag to indicate that the XML content is the specification of GUI element type content. The type mapping 308 is a mapping for a Window GUI element. The GAP alias 312 is "University Directory0", signifying the current version of a university directory GAP. The GUI element being typed has the unique element identifier 314 "0x30fb0" noted by the HWND identifier and established, for example, by an accessibility layer interface. The GUI type identifier 316 for the Window GUI element is "US-StateTextBox".

The type mapping 310 is a mapping for a Menu Item GUI element. The GAP alias 318 is "University Directory1", signifying the subsequent version of the university directory GAP. The GUI element being typed has the unique element identifier 320 "OpenFile" as specified by the Name field. The GUI type identifier 322 for the Window GUI element is "File-Open".

FIG. 3 also shows an example of a GUI element type specification message 324 using an XML representation. The GUI element type specification message 324 includes a GUI element type specification message header 326 and a GUI element type specification message terminator 328. The header 326 ("TypeGUIObject") and terminator 328 ("/TypeGUIObject") signify that the data within the message specifies a type mapping for a GUI element. To that end, the GUI element type specification message 324 may further include a GAP alias 330, GUI element identifier 332, and a GUI type identifier 334.

Figure 4:
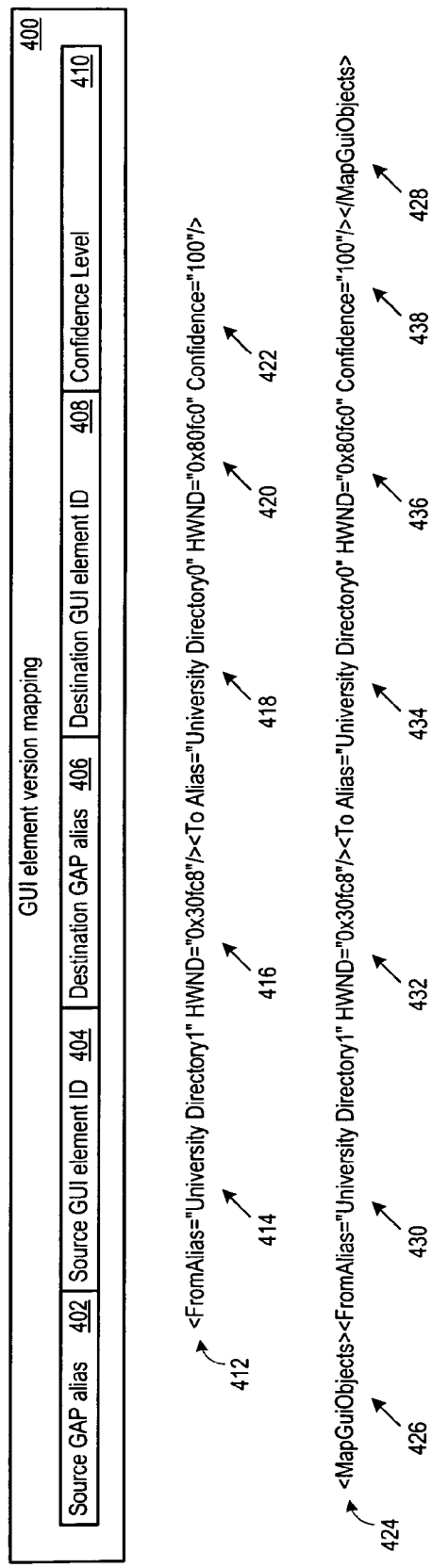
FIG. 4 shows examples of mapping specification messages.

FIG. 4 shows an example of a GUI element version mapping ("version mapping") 400 that may be a component of a GUI element mapping specification message 132. The version mapping 400 includes a source GAP alias 402, a source GUI element identifier 404, a destination GAP alias 406, a destination GUI element identifier 408, and a confidence level 410. Additional, fewer, or different fields may be included in the version mapping 400.

The source GAP alias 402 specifies an identifier for a GAP (the "source GAP") that includes a first specified GUI element, while the destination GAP alias 406 specifies an identifier for a GAP (the "destination GAP") that includes a second specified GUI element that should be linked to the first specified GUI element. The GAP aliases 402 and 406 may be unique identifiers that distinguish between GAPs or different versions of a GAP, such as identifiers that differentiate the current GAP version and the subsequent GAP version. The source GUI element identifier 404 may provide a unique identifier for the selected GUI element in the source GAP, while the destination GUI element identifier 408 may provide a unique identifier for the selected GUI element in the destination GAP.

FIG. 4 also shows a specific example of a version mapping 412 using a multimode structure in which one node is represented with the tag "FromAlias" and the second node is represented with the tag "ToAlias". The version mapping 412 specifies a source GAP alias 414 of "University Directory1", signifying the subsequent version of a university directory GAP. The source GUI element being mapped (e.g., a combo box), has the unique element identifier 416 "0x30fc8" tagged by a "HWND" label. The version mapping 412 also specifies a destination GAP alias 418 of "University Directory0", signifying the current version of a university directory GAP. The destination GUI element being mapped (e.g., a drop down listbox), has the unique element identifier 420 "0x30fc0" tagged by the "HWND" label. Thus, the version mapping 412 establishes that a particular drop down listbox in the subsequent version of the GAP corresponds to a particular combo box in the current GAP version. The element mapping 412 additionally specifies a confidence level 422 of 100, signifying that this mapping has a 100% certainty of being a correct mapping between elements.

FIG. 4 also shows an example of a GUI element mapping specification message 424. The GUI element mapping specification message 424 includes a GUI element mapping specification message header 426 ("MapGuiObjects") and a GUI element mapping specification message terminator 428 ("/MapGuiObjects"). The header 426 and terminator 428 signify that the data within the message specifies an element mapping between GUI elements in different GAPs or GAP versions. To that end, the GUI element type specification message 424 may further include a source GAP alias 430, a source GUI element identifier 432, a destination GAP alias 434, a destination GUI element identifier 436, and a confidence level 438.

The confidence level field 410 is an optional extension to the GUI element version mapping 400. The confidence level field 410 may specify a degree of reliability for the GUI element version mapping. When the version mapping arises from the efforts of a human operator, for example, the confidence level may be relatively high (e.g., 90-100%). When the version mapping arises from an automated analysis, the confidence level may be set to a specified level (e.g., a predefined level for automated matching), or may be set relative to a threshold that depends on the strength of the connection evident detected by the automated analysis.

For example, the automated analysis may determine a normalized score for any given attempt to match one GUI element to another GUI element. The confidence level field 410 may then specify the normalized score. The confidence level field 410 may further specify why the confidence level is set to any particular value. Furthermore, an explanation field (e.g., a character such as "M" or "A") may be included in the confidence level field 410 to denote that the confidence level arises from Manual or Automated analysis. Alternatively or additionally, the explanation field may include the tag "forced" and have a value of "0" or "1" depending on whether a version mapping was specified by a manual or automated analysis.

Figure 5:
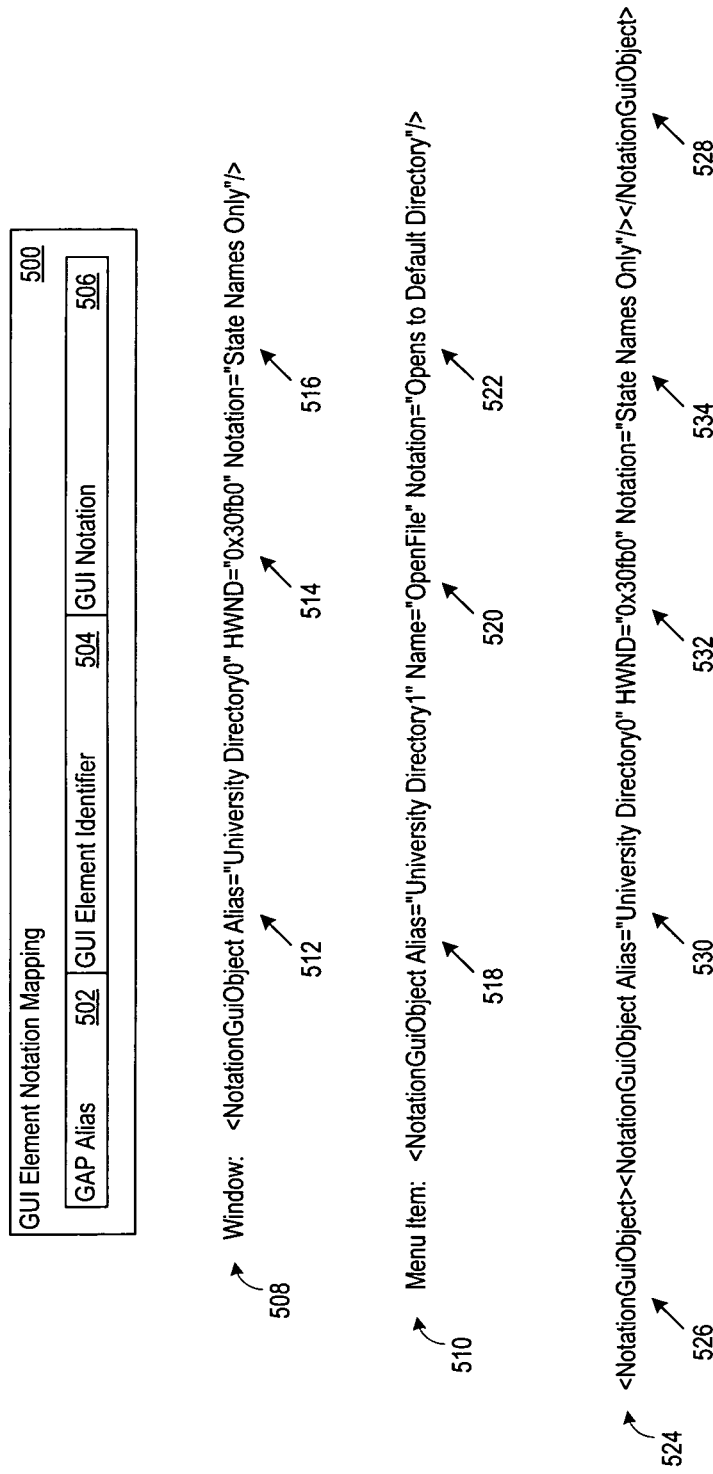
FIG. 5 shows examples of notation messages.

FIG. 5 shows an example of a GUI element notation mapping 500 that may be a component of a GUI element notation message 134. The notation mapping format 500 includes a GAP alias 502, a GUI element identifier 504, and a GUI notation 506. Additional, fewer, or different fields may be included in the notation mapping 500.

The GAP alias 502 specifies an identifier for the GAP which includes the GUI element to which a notation is being applied. The GAP alias 502 may be a unique identifier that distinguishes between GAPs or GAP versions, including a current GAP version and a subsequent version of the same GAP. The GUI element identifier 504 provides a unique identifier for the GUI element which is being notated. The GUI notation 506 specifies the notation being assigned to the GUI element (e.g., the text "State names only").

FIG. 5 also shows two examples of GUI notation mappings 508 and 510 using an XML representation. The notation mapping 508 is a mapping for a Window GUI element. The GAP alias 512 is "University Directory0", signifying the current version of a university directory GAP. The GUI element being notated has the unique element identifier 514 "0x30fb0" noted by the HWND identifier and established, for example, by an accessibility layer interface. The GUI notation 516 for the Window GUI element is the text "State names only".

The notation mapping 510 is a mapping for a Menu Item GUI element. The GAP alias 518 is "University Directory1", signifying the subsequent version of the university directory GAP. The GUI element being annotated has the unique element identifier 520 "OpenFile" as specified by the Name field. The GUI notation 522 for the Window GUI element is the text "Opens to Default Directory" as specified by the Annotation field.

FIG. 5 also shows an example of a GUI element notation message 524 in an XML representation. The GUI element notation message 524 may include a GUI element notation message header 526 ("NotationGuiObject") and a GUI element notation message terminator 528 ("/NotationGuiObject"). The header 526 and terminator 528 signify that the data within the message specifies a notation for a GUI element. To that end, the GUI element notation message 524 may further include a GAP alias 530, GUI element identifier 532, and a GUI notation 534.

Figure 6:
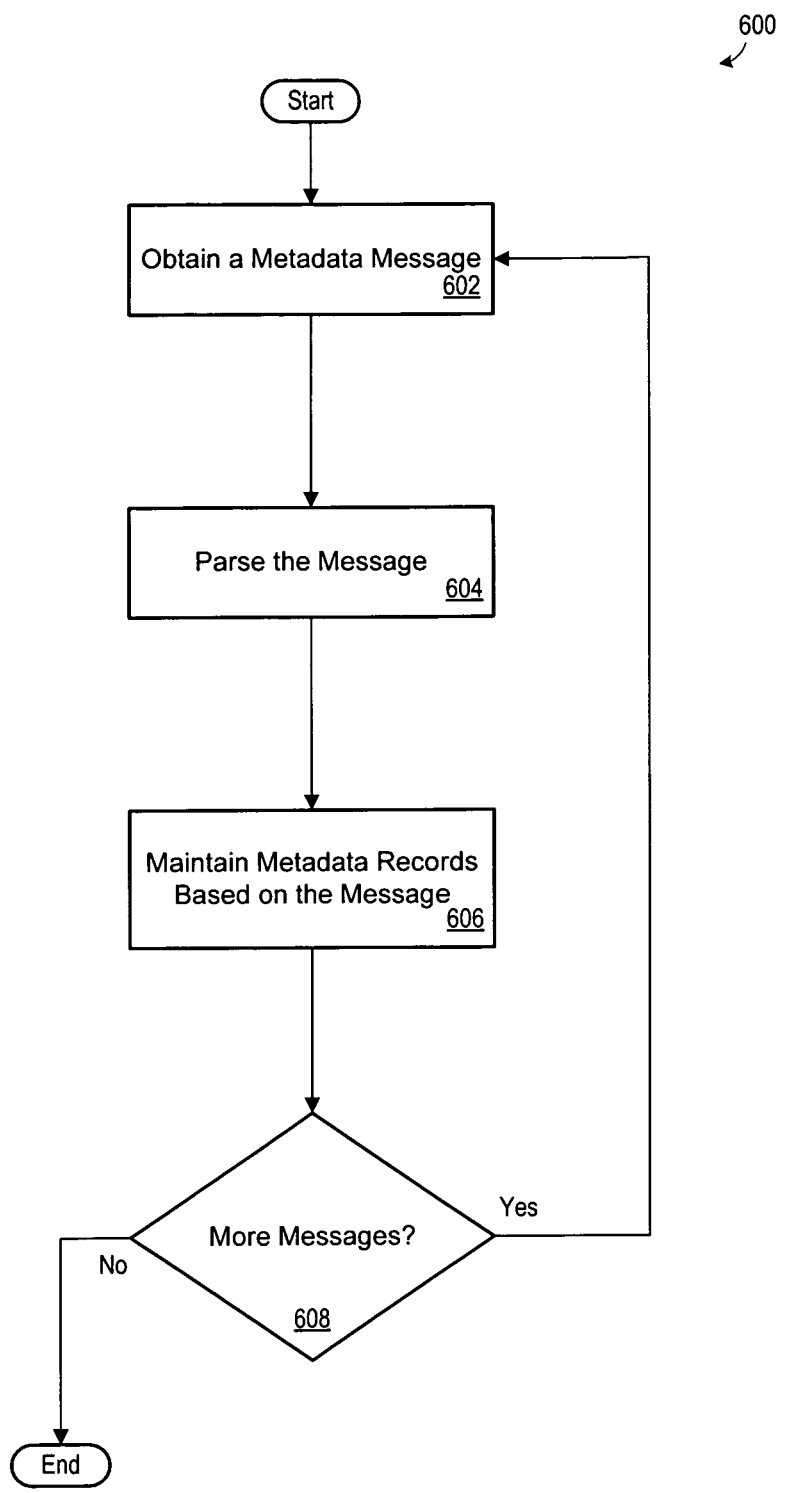
FIG. 6 shows a flow diagram of metadata processing.

FIG. 6 shows a flow diagram 600 of metadata message processing that the metadata processing logic 110 may perform. The metadata processing logic 110 may obtain a metadata message (602). For example, the metadata message may be obtained through the interface 102 and stored in the memory 106. The metadata processing logic 110 may instruct the processor 104 to then parse the metadata message (604). For example, the metadata processing logic 110 may parse a metadata message to obtain element identification information, GAP identification information, notation data, or other metadata. The metadata processing logic 110 may then maintain metadata records based on the information extracted from the parsed metadata message (606). Maintaining metadata records may include reading, writing, storing, copying, updating, moving, deleting, overwriting, appending, or otherwise manipulating the data within the metadata records. The metadata processing logic 110 may then check whether any more messages are available for processing (608). If more messages are available, the metadata processing logic 110 may then cycle back and obtain the next metadata message (602). If no more messages are available, then the metadata processing logic 110 may terminate.

Figure 7:
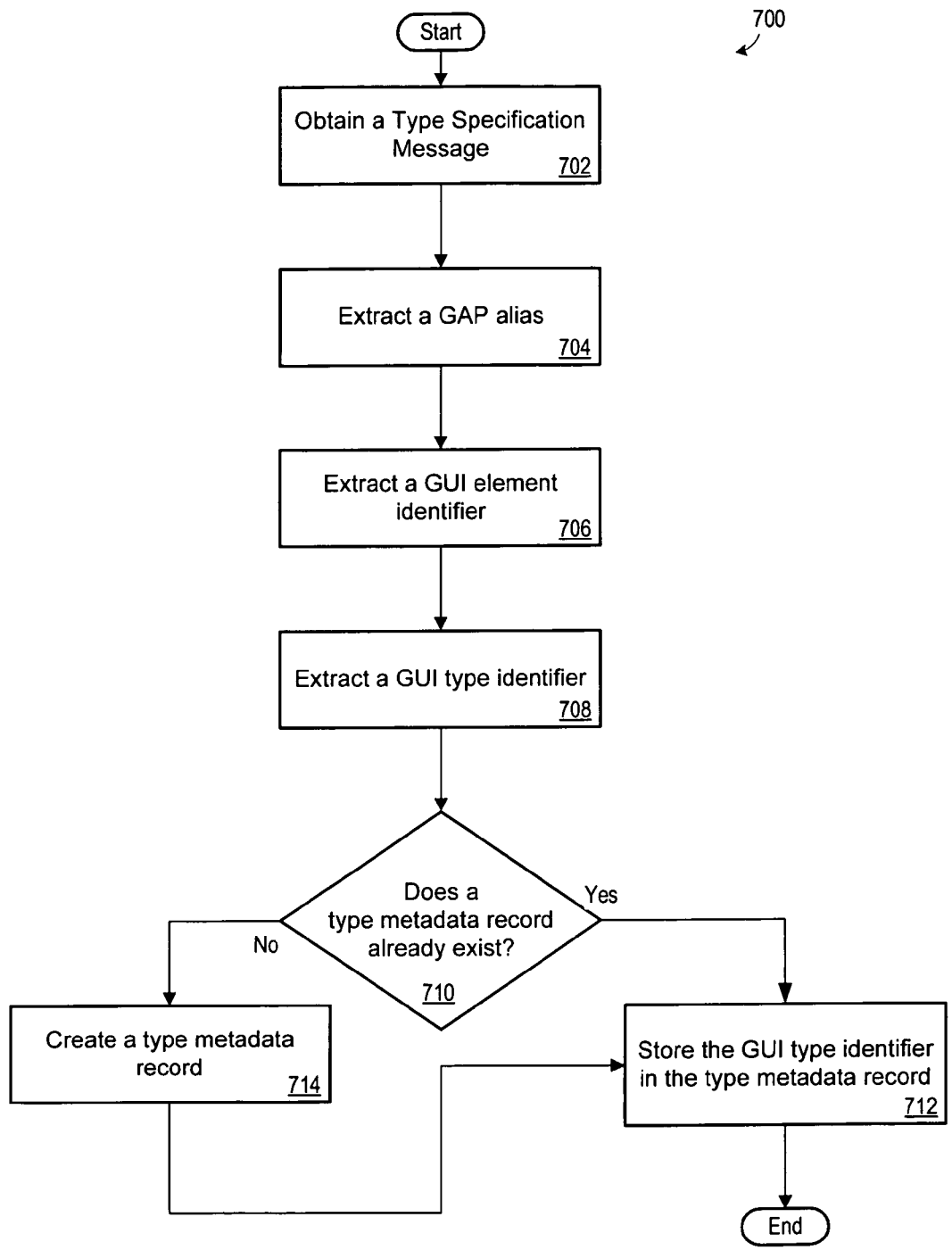
FIG. 7 shows a flow diagram of type processing.

FIG. 7 shows a flow diagram 700 of type processing that may be performed by type processing logic 118. The type processing logic 118 may first obtain a type specification message (702). The type specification message may be in the example format shown for the GUI element type specification message 324. The type processing logic 118 may then extract a GAP alias from the type specification message (704). The GAP alias may be delimited in an XML statement as illustrated by the GAP alias 330. The type processing logic 118 may then extract a GUI element identifier from the type specification message (706). The GUI element identifier may be delimited in an XML statement as illustrated by the GUI element identifier 332. The type processing logic 118 may then extract a GUI type identifier from the type specification message (708). The GUI type identifier may be delimited in an XML statement as illustrated by the GUI type identifier 334.

The type processing logic 118 may then determine whether a type metadata record corresponding to the GAP alias and GUI element identifier already exists (710). If a type metadata record already does exist for the GAP alias and GUI element identifier, then the type processing logic 118 stores the GUI type identifier in the type metadata record (712). The type processing logic 118 may store the GUI type identifier by overwriting an already existing GUI type identifier or storing the GUI type identifier in a blank GUI type identifier field. In addition, the type processing logic 118 may display a confirmation request prompt before overwriting an existing identifier, or may employ any other conflict resolution technique before storing or overwriting data. If a type metadata record does not already exist for the GAP alias and the GUI element identifier, then the type processing logic 118 may create a type metadata record for the GAP alias and the GUI element identifier (714). The type processing logic 118 may then store the GUI type identifier in the type metadata record (712).

Figure 8:
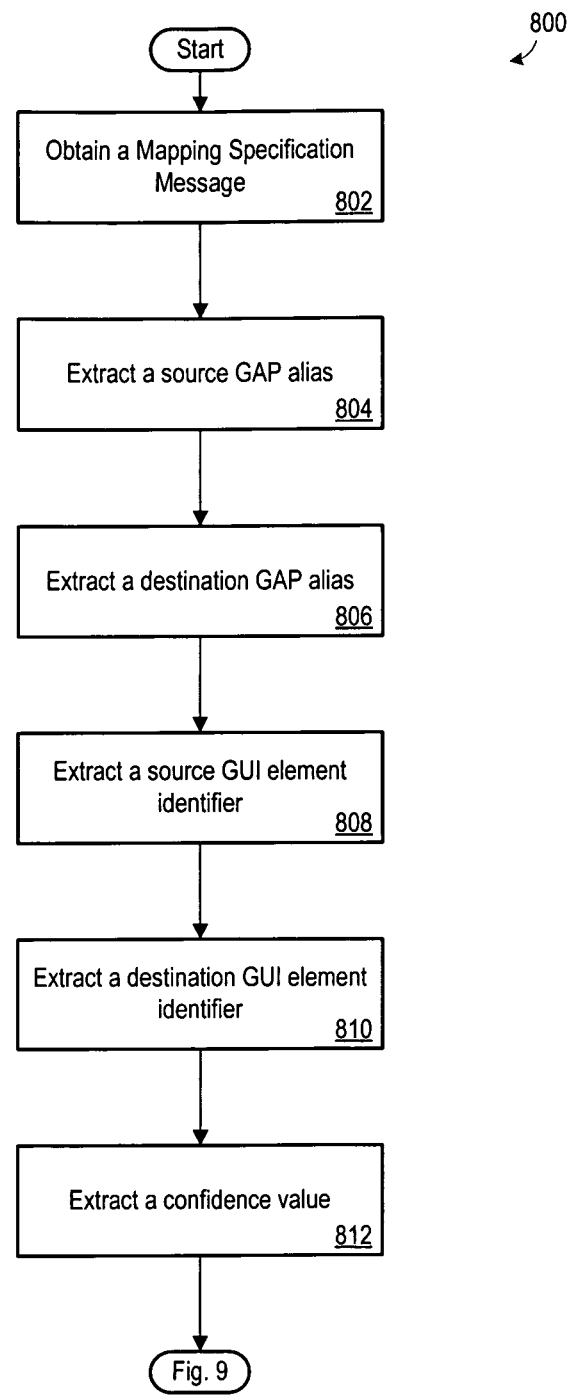
FIG. 8 shows a first part of a flow diagram of mapping processing.

FIG. 8 shows a first part of a flow diagram 800 of mapping processing that may be performed by the mapping processing logic 120. The mapping processing logic 120 may first obtain a mapping specification message (802). The mapping specification message may be in the example format shown for the GUI element version mapping message 424. The mapping processing logic 120 may then extract a source GAP alias from the mapping specification message (804). The source GAP alias may be delimited in an XML statement as illustrated by the source GAP alias 430. The mapping processing logic 120 may then extract a destination GAP alias from the mapping specification message (806). The destination GAP alias may be delimited in an XML statement as illustrated by the destination GAP alias 434. The mapping processing logic 120 may then extract a source GUI element identifier from the mapping specification message (808). The source GUI element identifier may be delimited in an XML statement as illustrated by the source GUI element identifier 432. The mapping processing logic 120 may then extract a destination GUI element identifier from the mapping specification message (810). The destination GUI element identifier may be delimited in an XML statement as illustrated by the destination GUI element identifier 436. The mapping processing logic 120 may then extract a confidence value from the mapping specification message (812). The confidence value may be delimited in an XML statement as illustrated by the confidence value 438.

Figure 9:
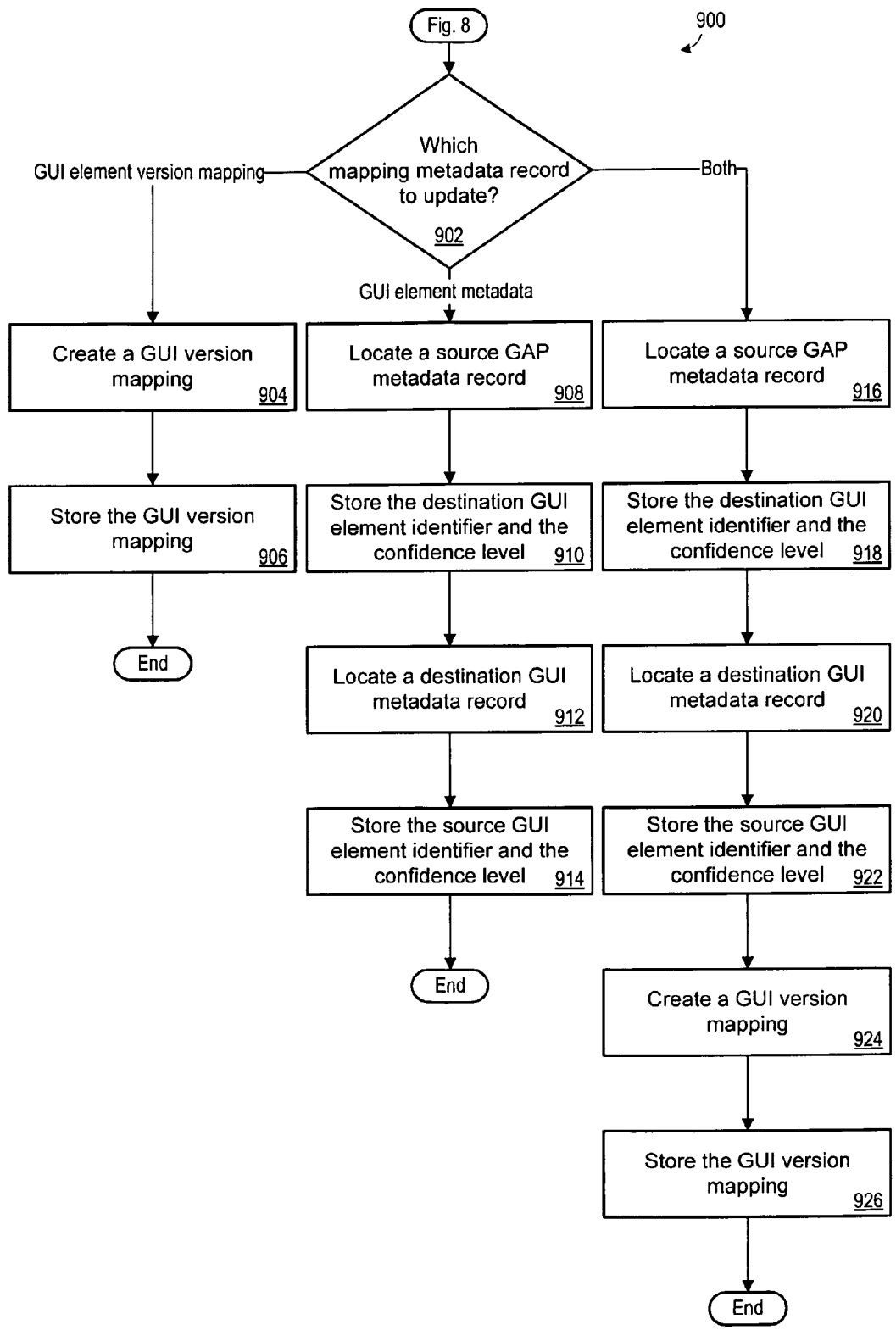
FIG. 9 shows a second part of a flow diagram of mapping processing.

FIG. 9 shows a second part of a flow diagram 900 of mapping processing that may be performed by mapping processing logic 120. The mapping processing logic 120 may decide which mapping metadata record to update (902). This decision may be based on pre-existing or default settings. Alternatively or additionally, the decision may be based on a mapping instruction received from a user in response to an instruction prompt. If the mapping instruction specifies updating the GUI element version mapping record, then the mapping processing logic 120 may create a GUI version mapping (904). The GUI version mapping may be delimited in an XML statement as illustrated by the version mapping 412. The mapping processing logic 120 may then store the GUI version mapping (906). For example, the GUI version mapping may be stored in the GUI element version mapping record 208.

If the mapping instruction specifies updating the GUI element metadata records, then the mapping processing logic 120 may locate a source GAP metadata record in a metadata repository (908). The metadata repository may be the metadata repository 108. The source GAP metadata record may be in the example format shown for the GAP 0 metadata record 202. The source GAP metadata record may be located by comparing the source GAP alias extracted from the mapping specification message (804) with a GAP identifier, such as GAP 0 identifier 210. The mapping processing logic 120 may then store the destination GUI element identifier (910). For example, the destination GUI element identifier may be stored in the GUI element mapping field 230. Alternatively or additionally, the confidence level may be stored. For example, the confidence level may be stored in the other metadata field 232. The mapping processing logic 120 may then locate a destination GUI record (912). The destination GAP metadata record may be similar to GAP 1 metadata record 204. The destination GAP metadata record may be located by comparing the destination GAP alias extracted from the mapping specification message (806) with a GAP identifier, such as GAP 1 identifier 212. The mapping processing logic 120 may then store the source GUI element identifier (914). For example, the source GUI element identifier may be stored in the GUI element mapping field 230. Alternatively or additionally, the confidence level may be stored. For example, the confidence level may be stored in the other metadata field 232. The mapping processing logic 230 may then terminate. These steps need not be performed in any particular order. Some steps may be added or removed without affecting the aims of the process.

If the mapping instruction specifies updating both the GUI element metadata records and the GUI version mapping records, then the mapping processing logic 120 may first locate a source GAP metadata record in a metadata repository (916). The mapping processing logic 120 may then store the destination GUI element identifier and/or the confidence level (918). The mapping processing logic 120 may then locate a destination GUI metadata record (920). The mapping processing logic 120 may then store the source GUI element identifier and/or the confidence level (922). The mapping processing logic 120 may then create a GUI version mapping (924). The mapping processing logic 120 may then store the GUI version mapping in the GUI version mapping records (926). The mapping processing logic 120 may then terminate. These steps need not be performed in any particular order. Some steps may be added or removed without affecting the aims of the process.

Figure 10:
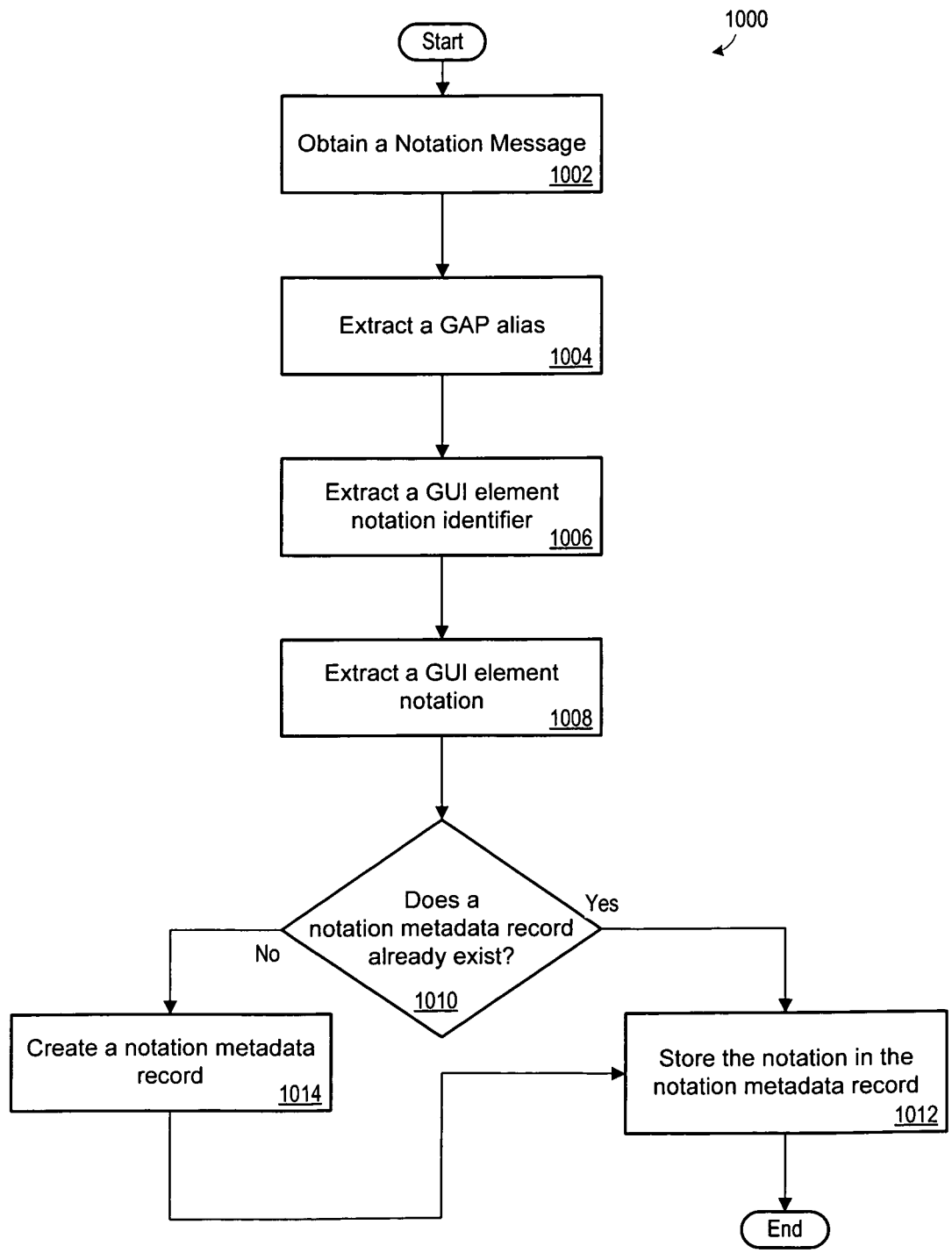
FIG. 10 shows a flow diagram of notation processing.

FIG. 10 shows a flow diagram 1000 of notation processing that may be performed by notation processing logic 122. The notation processing logic 122 may first obtain a notation message (1002). The notation message may be in the format shown for the GUI element notation message 524. The notation processing logic 122 may then extract a GAP alias from the notation message (1004). The GAP alias may be delimited in an XML statement as illustrated by the GAP alias 530. The notation processing logic 122 may then extract a GUI element identifier from the notation message (1006). The GUI element identifier may be delimited in an XML statement as illustrated by the GUI element identifier 532. The notation processing logic 122 may then extract a GUI notation from the notation message (1008). The GUI notation may be delimited in an XML statement as illustrated by the GUI notation 534.

The notation processing logic 122 may then determine whether there already exists a notation metadata record corresponding to the GAP alias and GUI element identifier extracted from the notation message (1010). If a notation metadata record already does exist for the GAP alias and GUI element identifier, then the notation processing logic 122 can store the GUI notation in the notation metadata record (1012) before terminating. The notation processing logic 122 may store the GUI notation by overwriting an already existing GUI notation, storing the GUI notation in a blank GUI notation field, displaying a prompt before overwriting an existing notation, appending the notation with an existing notation, or using any other suitable form of resolving conflicts before storing data. If a notation metadata record does not already exist for the GAP alias and the GUI element identifier, then the notation processing logic 122 may create a notation metadata record for the GAP alias and the GUI element identifier (1014). The notation processing logic 122 may then store the GUI notation in the notation metadata record (1012) before terminating.

Figure 11:
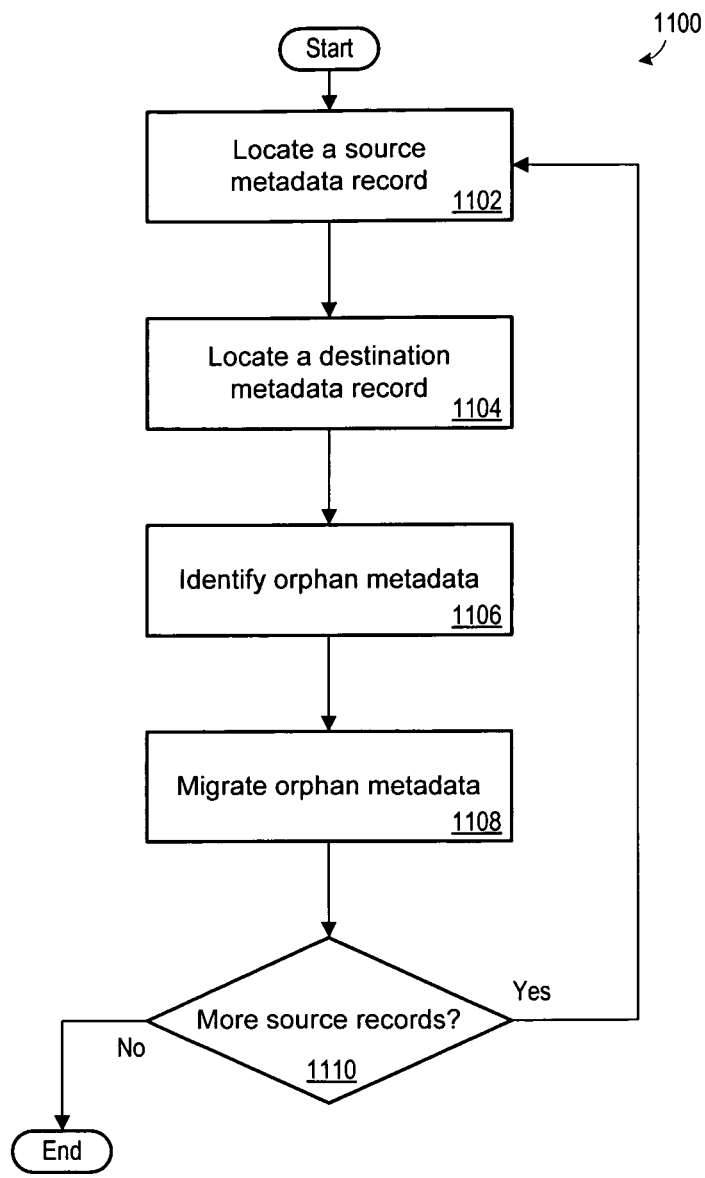
FIG. 11 shows a flow diagram of metadata migration processing.

FIG. 11 shows a flow diagram 1100 of metadata migration processing that the metadata migration logic 124 may perform. The metadata migration logic 124 may locate a source metadata record (1102). The metadata migration logic 124 may then locate a destination metadata record (1104). The metadata migration logic 124 may then identify orphan metadata (1106). Orphan metadata may include metadata stored in a GUI element metadata record where the metadata is not also stored in another GUI element metadata record to which the first GUI element metadata record is mapped. Alternatively or additionally, orphan metadata may include metadata associated with a GUI element where the GUI element does not have a mapping to another GUI element. The metadata migrating logic 124 may then migrate any orphan metadata (1108). The migration may occur automatically. Alternatively or additionally, the migration may occur after the display of a prompting message. If more source messages are available (1110), the metadata migrating logic 124 may then cycle back and obtain the next source record (1102). If no more source records are available (1110), then the metadata migration logic 124 may cease.

Figure 12:
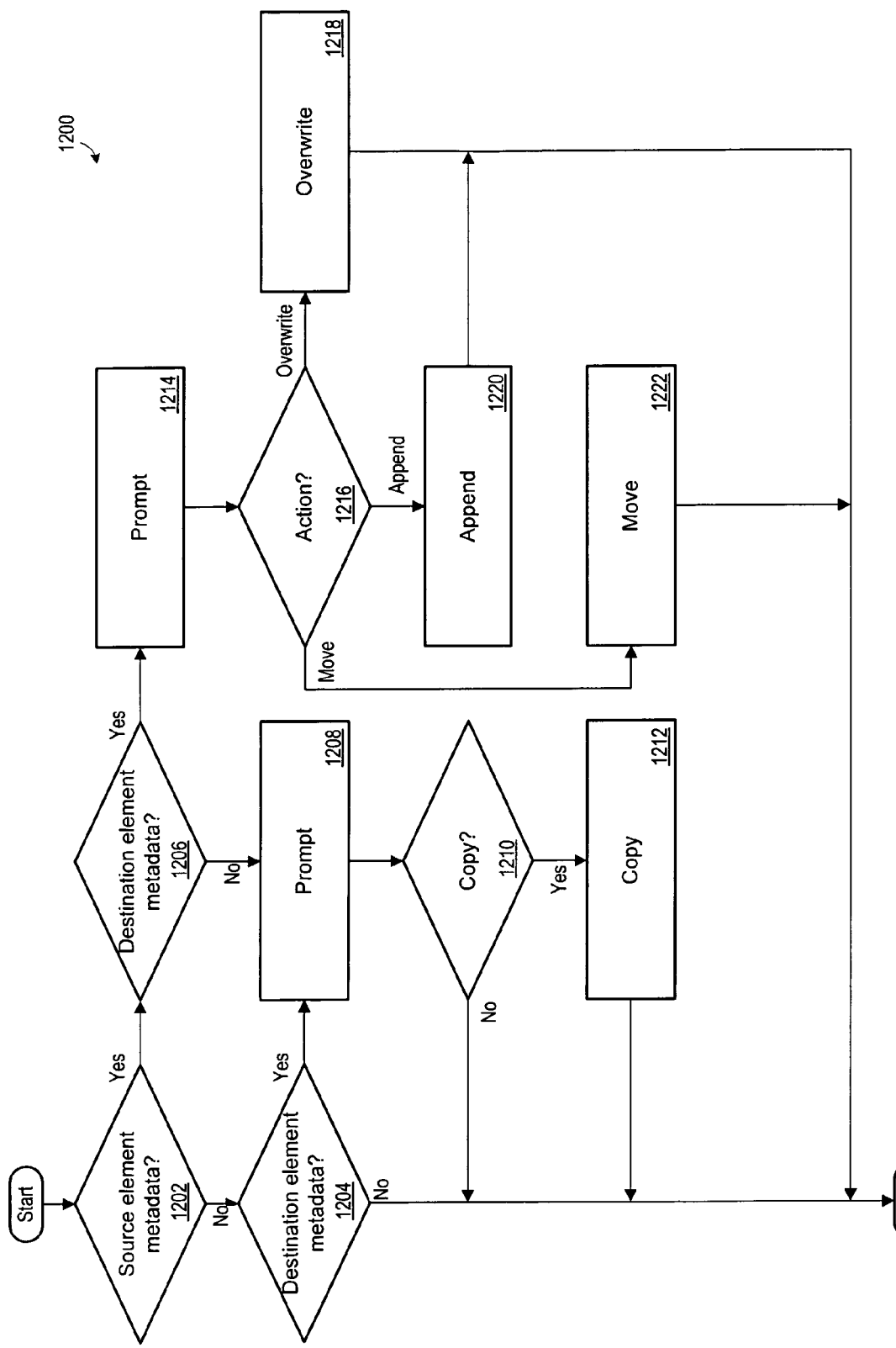
FIG. 12 shows a flow diagram of metadata migration processing.

FIG. 12 shows a flow diagram 1200 of metadata migration processing that may be performed by metadata migration logic 124. The metadata migration logic 124 may, for example, execute the processing during a mapping process, such as mapping processes 800 and 900. This metadata migration processing may assist in moving all of the existing metadata or any overlooked metadata from one GAP to another or one GAP version to another.

The metadata migration logic 124 may first determine whether the source GUI element has metadata associated with it (1202). For example, the metadata migration logic 124 may use a source GAP alias and a source GUI element identifier to locate a source GUI element metadata record. Then the metadata migration logic 124 may search within that source GUI element metadata record for any relevant metadata fields, such as a type field 226, notation field 228, or other metadata field 232. If the metadata migration logic 124 determines that the source GUI element does not have relevant metadata associated with it, the metadata migration logic 124 may then determine whether the destination GUI element has metadata associated with it (1204). This determination may be performed in a manner similar to determining whether the source GUI element had metadata associated with it (1202). If the metadata migration logic 124 determines that the destination GUI element does not have relevant metadata associated with it, the logic may terminate.

If the metadata migration logic 124 determines that a source GUI element has metadata associated with it, the metadata migration logic 124 determines whether a destination GUI element has metadata associated with it (1206). This determination may be performed in a manner similar to determining whether the source GUI element had metadata associated with it (1202). If the metadata migration logic 124 determines that the destination GUI element does not have metadata associated with it, the metadata migration logic 124 may provide a prompt for further processing instructions (1208). The prompt may ask for instructions on whether to copy metadata from the GUI element with the metadata to the GUI element record without the metadata (1210). If the response to the prompt is 'no', then the logic may terminate. If the response to the prompt is 'yes', then the logic may perform the copy process (1212) before terminating. A similar process occurs where a source GUI element does not have metadata, but a destination GUI element does.

If the metadata migration logic 124 determines that both a source GUI element and a destination GUI element each have metadata associated with them, the metadata migration logic 124 may provide a prompt for further processing instructions (1214). For example, the prompt may include options for Overwriting one of the sets of metadata with the other, Appending one set of metadata with the other (or optionally, append each set of metadata to the other), or Moving one set of metadata to a completely different GUI element metadata record (1216). If the response to the prompt includes Overwriting one of the sets of metadata with the other, then the metadata migration logic 124 may perform the overwrite process (1218) before terminating. If the response to the prompt includes Appending one set of metadata to the other, then the metadata migration logic 124 may perform the appending process (1220) before terminating. If the response to the prompt includes Moving one set of metadata, the metadata migration logic 124 may perform the move process (1222) before terminating. Alternatively or additionally, the metadata migration logic 124 may perform the move process (1222) and then provide another prompt for a continued action, such as copying one set of metadata into the metadata record vacated by the move process, similar to the copy prompt (1210).

Figure 13:
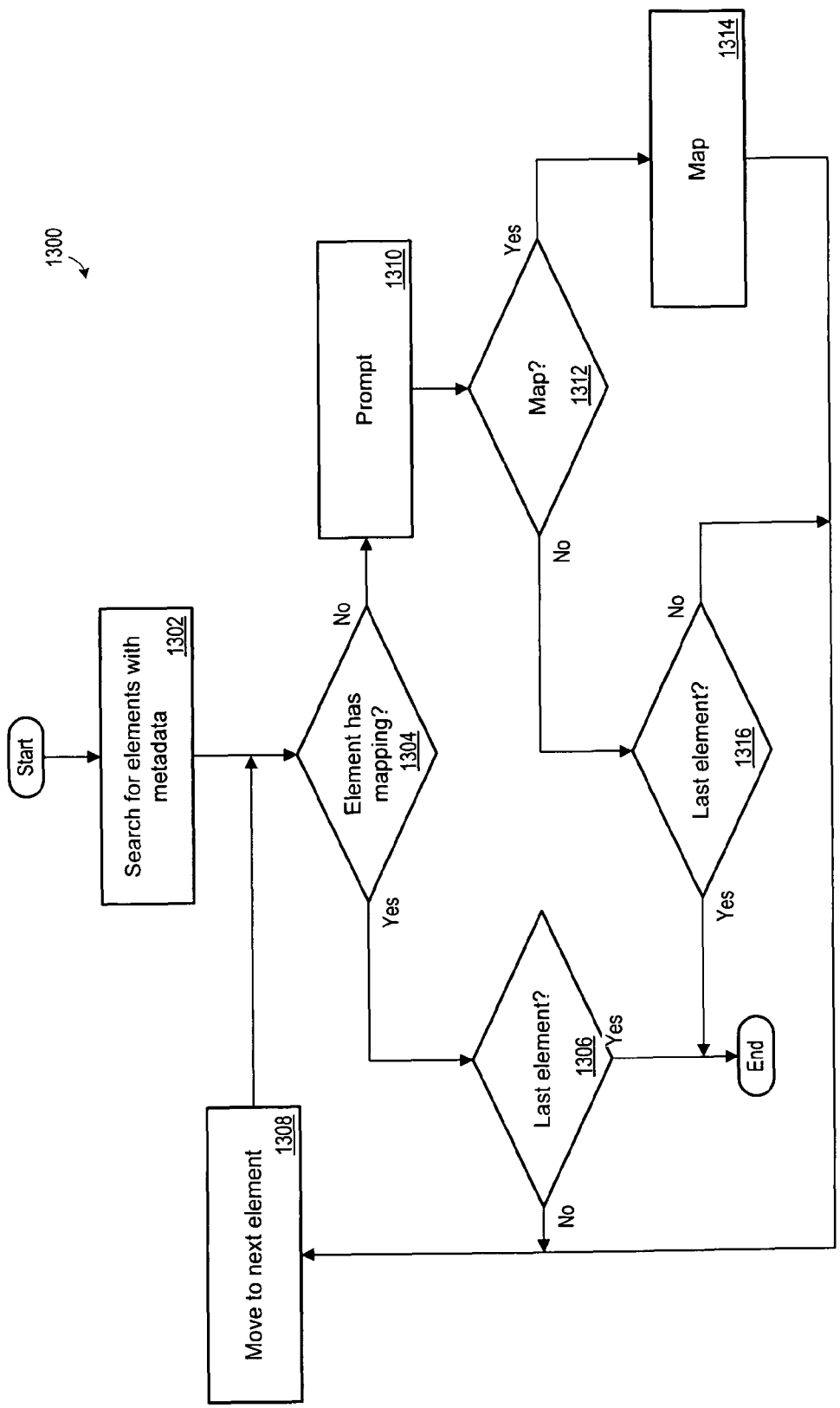
FIG. 13 shows a flow diagram of metadata migration processing.

FIG. 13 shows a flow diagram 1300 of metadata migration processing that may be performed by metadata migration logic 124. The metadata migration logic 124 may first search for GUI elements that have metadata associated with them (1302). For example, this search may be performed by accessing a GAP or GAP version metadata record and accessing each GUI element metadata record stored with that record. Alternatively or additionally, the metadata migration logic 124 may look up a list of GAPs or GAP versions along with associated GUI element identifiers and access the GUI element metadata records for each of the GUI element identifiers individually. Alternatively or additionally, the metadata migration logic 124 may perform a depth-first, breadth-first, or other search technique to access all the GUI element metadata records within a metadata repository. Once the metadata migration logic 124 has acquired a GUI element, it may determine whether the GUI element has appropriate metadata in a manner similar to determining whether the source GUI element had metadata associated with it (1202).

Once the metadata migration logic 124 has identified a GUI element with metadata associated with it, the metadata logic 124 may determine whether the GUI element has a mapping associated with it (1304). For example, this determination may include looking at a GUI element mapping field 230 within the GUI element metadata record. Alternatively or additionally, the determination may have been made by another logic process with the result from the metadata migration logic 124 passed along with the identification of the GUI element.

If the metadata migration logic 124 determines that the GUI element has a an associated mapping, the metadata migration logic 124 may assume that another metadata migration logic process, such as the logic process 1200, has already migrated any relevant metadata, and thus next determine whether that GUI element was the last element that needed to be checked for metadata migration (1306). This determination may include looking at the next GAP or GAP version and associated GUI element identifier in a list. Alternatively or additionally, the determination may include looking at the next GUI element metadata record brought up in a depth-first, breadth-first, or other appropriate search algorithm. If the metadata migration logic 124 determines that the GUI element was the last GUI element to process, then the metadata migration logic 124 may terminate.

If the metadata migration logic 124 determines that the GUI element was not the last GUI element to be processed, the metadata migration logic 124 may move to the next GUI element (1308). This move may include accessing the next GAP or GAP version and associated GUI element identifier in a list. Alternatively or additionally, the move may include accessing the next GUI element metadata record brought up in a depth-first, breadth-first, or other appropriate search algorithm. After the move, the metadata migration logic 124 may cycle back and determine whether the new GUI element has a mapping associated with it (1304).

If the metadata migration logic 124 determines that a GUI element does not have a mapping associated with it, then the metadata migration logic 124 may provide a prompt for further instructions (1310). The prompt may request further instructions as to whether to map the GUI element to another GUI element (1312). If the response to the prompt includes a 'yes', then the metadata migration logic 124 may activate a mapping processing logic 120 and terminate (1314). Alternatively or additionally, the metadata migration logic 124 may activate a mapping processing logic 120 and a metadata migration processing 1200 before terminating.

If the response to the prompt 1312 includes a 'no', then the metadata migration logic 124 may determine whether that GUI element was the last element that needed to be checked for metadata migration (1316), similar to the check 1306. If the metadata migration logic 124 determines that the GUI element was the last GUI element to process, then the metadata migration logic 124 may terminate. If the metadata migration logic 124 determines that the GUI element was not the last GUI element to be processed, the metadata migration logic 124 may move to the next GUI element (1308).

The systems may be implemented in many different ways. For example, although some features are shown stored in computer-readable memories (e.g., as logic implemented as computer-executable instructions or as data structures in memory), all or part of the systems, logic, and data structures may be stored on, distributed across, or read from other machine-readable media. The media may include hard disks, floppy disks, CD-ROMs, a signal, such as a signal received from a network or partitioned into sections and received in multiple packets communicated across a network. The systems may be implemented in software, hardware, or a combined form of software and hardware.

Furthermore, the systems may be implemented with additional, different, or fewer components. As one example, a processor or any other logic may be implemented with a microprocessor, a microcontroller, a DSP, an application specific integrated circuit (ASIC), program instructions, discrete analog or digital logic, or a combination of other types of circuits or logic. As another example, memories may be DRAM, SRAM, Flash or any other type of memory. The systems may be distributed among multiple components, such as among multiple processors and memories, optionally including multiple distributed processing systems. Logic, such as programs or circuitry, may be combined or split among multiple programs, distributed across several memories and processors, and may be implemented in or as a function library, such as a dynamic link library (DLL) or other shared library.

While various embodiments of the metadata evolution tool have been described, it will be apparent to those of ordinary skill in the art that many more embodiments and implementations are possible within the scope of the invention. Accordingly, the invention is not to be restricted except in light of the attached claims and their equivalents.

What is claimed is:

1. A product comprising:
    a non-transitory memory; and
    graphical user interface (GUI) metadata processing logic, executable by a processor coupled to the non-transitory memory, stored in the memory, the GUI metadata processing logic comprising:
        communication logic executable by the processor that when executed causes the processor to:
            obtain a GUI element type specification message comprising a GUI element identifier that includes a unique identifier for the GUI element which is being typed and a GUI type identifier that specifies the GUI element type being assigned to the GUI element; and
            obtain a GUI element mapping specification message comprising a GUI element mapping specification message header and a GUI element mapping specification message terminator;
        parsing logic executable by the processor that when executed causes the processor to parse:
            the GUI element type specification message to extract:
                the GUI element identifier and the GUI type identifier from the GUI element type specification message, and
                a GUI application (GAP) alias comprising an unique identifier that distinguishes between: 1) GAPs and 2) GAP versions or subsequent version of the same GAP; and
            the GUI element mapping specification message to extract a source GUI element identifier and a destination GUI element identifier from the GUI element mapping specification message; and
        type processing logic executable by the processor that when executed causes the processor to create a GUI element type metadata record by storing the extracted GUI element identifier and the extracted GUI type identifier in a GUI element metadata repository, where the GUI element type metadata record is located by the GUI element identifier.

2. The product of claim 1, where the communication logic further causes the processor to obtain the GUI element type specification message from a GUI typing system.

3. The product of claim 1, where
    the non-transitory memory further comprises mapping processing logic executable by the processor that when executed by the processor causes the processor to maintain a GUI mapping metadata record comprising using the source GUI element identifier and the destination GUI element identifier to aid developers to conform future applications to restrictions and requirements.

4. The product of claim 1, where the communication logic further causes the processor to obtain the GUI element mapping specification message from a GUI mapping system.

5. The product of claim 1,
    where the source GUI element identifier includes an unique identifier for the selected GUI element in a source GAP alias;
    where the source GAP alias specifies a source GAP identifier for a source GAP;
    where the source GAP identifier for the source GAP includes a first specified GUI element;
    where the destination GUI element identifier provides a unique identifier for the selected GUI element in a destination GAP alias;
    where the destination GAP alias specifies a destination GAP identifier for a destination GAP;
    where the destination GAP identifier for the destination GAP includes a second specified GUI element linked to the first specified GUI element;
    where the parsing logic further causes the processor to:
        parse the GUI element mapping specification message for the source GUI application (GAP) alias and the destination GAP alias, and
        where the mapping processing logic is further operable to:
            maintain the GUI mapping metadata record by creating a GUI element version mapping record comprising:
                the source GAP alias;
                the source GUI element identifier;
                the destination GAP alias; and
                the destination GUI element identifier.

6. The product of claim 1, where the parsing logic further causes the processor to:
    parse the GUI element mapping specification message for the source GUI application (GAP) alias and the destination GAP alias, and
    where the mapping processing logic is further operable to maintain the GUI mapping metadata record by:
        locating the source GAP metadata record using the source GAP alias and storing the destination GUI element identifier in the source GAP metadata record; and
        locating the destination GAP metadata record using the destination GAP alias and storing the source GUI element identifier in the destination GAP metadata record.

7. The product of claim 1,
    where the communication logic further causes the processor to obtain a GUI element notation message comprising information for a GUI element; and
    where the parsing logic is further operable to parse the GUI element notation message for the GUI application (GAP) alias, a GUI element notation identifier, and a GUI element notation; and
    where the memory further comprises:
        notation processing logic operable to maintain a GUI element notation metadata record using the GAP alias, the GUI element notation identifier, and the GUI notation in the GUI element metadata repository.

8. The product of claim 7, where the notation processing logic further causes the processor to locate the GUI element notation metadata record using the GAP alias.

9. A method of maintaining a graphical user interface (GUI) metadata repository, the method comprising:
  obtaining a GUI element type specification message comprising a GUI element identifier that includes a unique identifier for the GUI element which is being typed and a GUI type identifier that specifies the GUI element type being assigned to the GUI element; and
  obtaining the GUI element mapping specification message that includes a GUI element mapping specification message header and a GUI element mapping specification message terminator;
    parsing the GUI element type specification message to extract:
      the GUI element identifier and the GUI type identifier from the GUI element type specification message, and
      a GUI application (GAP) alias comprising an unique identifier that distinguishes between: 1) GAPs and 2) GAP versions or subsequent version of the same GAP; and
    parsing the GUI element mapping specification message to extract:
      a source GUI element identifier; and
      a destination GUI element identifier from the GUI element mapping specification message; and
    creating a GUI element type metadata record by storing the extracted GUI element identifier and the extracted GUI type identifier in a GUI element metadata repository, where the GUI element type metadata record is located by the GUI element identifier.

10. The method of claim 9, where the GUI element type specification is obtained from a GUI typing system.

11. The method of claim 9 further comprising:
  maintaining a GUI mapping metadata record using the source GUI element identifier and the destination GUI element identifier to aid developers to conform future applications to restrictions and requirements.

12. The method of claim 9, where the GUI element mapping specification is obtained from a GUI mapping system.

13. The method of claim 9,
  where the source GUI element identifier includes an unique identifier for the selected GUI element in a source GAP alias;
  where the source GAP alias specifies a source GAP identifier for a source GAP;
  where the source GAP identifier for the source GAP includes a first specified GUI element;
  where the destination GUI element identifier provides a unique identifier for the selected GUI element in a destination GAP alias;
  where the destination GAP alias specifies a destination GAP identifier for a destination GAP;
  where the destination GAP identifier for the destination GAP includes a second specified GUI element linked to the first specified GUI element; and
  further comprising:
    parsing the GUI element mapping specification message for the source GUI application (GAP) alias and the destination GAP alias, and maintaining the GUI mapping metadata record comprises:
      creating a GUI element version mapping record comprising:
        the source GAP alias;
        the source GUI element identifier;
        the destination GAP alias; and
        the destination GUI element identifier.

14. The method of claim 9, further comprising:
  parsing the GUI element mapping specification message for a source GUI application (GAP) alias and a destination GAP alias;
  locating a source GAP metadata record using the source GAP alias and storing the destination GUI element identifier in the source GAP metadata record; and
  locating a destination GAP metadata record using the destination GAP alias and storing the source GUI element identifier in the destination GAP metadata record.

15. The method of claim 9, further comprising:
  obtaining a GUI element notation message comprising information for a GUI element; parsing the GUI element notation message for a GUI application (GAP) alias, a GUI element notation identifier, and a GUI element notation; and maintaining a GUI element notation metadata record using the GAP alias, the GUI element notation identifier, and the GUI notation in the GUI element metadata repository.

16. The method of claim 15 further comprising locating the GUI element notation metadata record using the GAP alias.

* * * * *